United States Patent [19]
Novkov

[11] 3,802,042
[45] Apr. 9, 1974

[54] CUTOFF TOOL HAVING IMPROVED RIGIDITY PROPERTIES

[75] Inventor: Raymond E. Novkov, Cuyahoga Falls, Ohio

[73] Assignee: The Warner & Swasey Company, Cleveland, Ohio

[22] Filed: July 17, 1972

[21] Appl. No.: 272,291

[52] U.S. Cl. .................................................. 29/96
[51] Int. Cl. ............................................. B26d 1/00
[58] Field of Search .................................. 29/95, 96

[56] References Cited
UNITED STATES PATENTS

| 3,343,431 | 9/1967 | Boyer | 29/96 X |
| 3,125,798 | 3/1964 | Stein | 29/96 X |
| 2,846,756 | 8/1958 | Novkov | 29/96 |
| 3,543,363 | 12/1970 | Diemond | 29/96 |
| 2,225,327 | 12/1940 | Walker | 29/96 |

Primary Examiner—Leonidas Vlachos
Attorney, Agent, or Firm—Freeman & Taylor

[57] ABSTRACT

An improved cutoff tool comprising a tool body, a support blade clamped thereto, a stop member seated on the support blade, and a clamping member adapted to be secured to the tool body and overlie the support blade so that the insert bit and the stop member may be clamped between the clamping member and the support blade, with the support blade and the tool body interlocking in a unique way so as to provide added rigidity and extreme compactness.

4 Claims, 4 Drawing Figures 3,802,042

CUTOFF TOOL HAVING IMPROVED RIGIDITY PROPERTIES

RELATED APPLICATIONS

This application is an improvement of an earlier filed, co-pending application filed Dec. 13, 1971, as Ser. No. 207,056 and entitled "Improved Cutoff Tool" by William B. Stein.

BACKGROUND OF THE INVENTION

1. Field of the Invention

This invention relates to the art of metal cutoff, and particularly relates to tooling of the type that is designed to be mounted on a cross slide for movement radially inwardly with respect to a revolving workpiece so as to effectuate cutoff thereof.

2. Description of the Prior Art

Cutoff tools of the general type herein being contemplated originally came into popular acceptance in the late 1950's with Novkov U.S. Pat. 2,846,756 illustrating a typical cutoff tool of this type.

While the tool described in the aforementioned Novkov patent has achieved universally wide acceptance and constituted an advance in the art, it has nonetheless been found that the overall effectiveness of such tooling can be improved if certain modifications are made as described below.

SUMMARY OF THE INVENTION

In the co-pending application Ser. No. 207,056 filed Dec. 13, 1971, and entitled "Improved Cutoff Tool" referred to above, there was disclosed a cutoff tool that featured a mechanical interlock between the tool body and the support blade, with such interlock being provided by use of a tongue and groove type of connection between the tool body and the support blade.

By use of this construction a considerable number of advantages did occur, especially when a stop member was used to serve as a stop against the unused end of a double-ended cutoff insert without any damage to the cutting tip thereof during its period of stored non-use.

While increased efficiency has been achieved by use of the invention of the above-described disclosure, it has been found that even greater rigidity can be achieved by modifying the contour of the support blade to include a hook-like depending portion on the forward end thereof that will engage an appropriate portion of the tool body to resist turning movement around its longitudinal axis upon the application of cutting forces thereto.

Further, it has been found that by use of such a hook-like projection, the width of the portion of the support blade to be clamped can be increased while still permitting a greater forward projection of the portion of the support blade that actually serves to support the cutting bit per se.

Production of an improved cutoff tool having the aforementioned desired characteristics accordingly becomes the principal object of this invention, with other objects thereof becoming more apparent upon a reading of the following brief specification considered and interpreted in view of the accompanying drawings.

OF THE DRAWINGS:

FIG. 1 is an exploded perspective view showing the principal components of the invention.
FIG. 2 is a front elevational view.
FIG. 3 is a partial side elevational view.
FIG. 4 is a partial top plan view.

DESCRIPTION OF THE PREFERRED EMBODIMENTS

Figure 1:
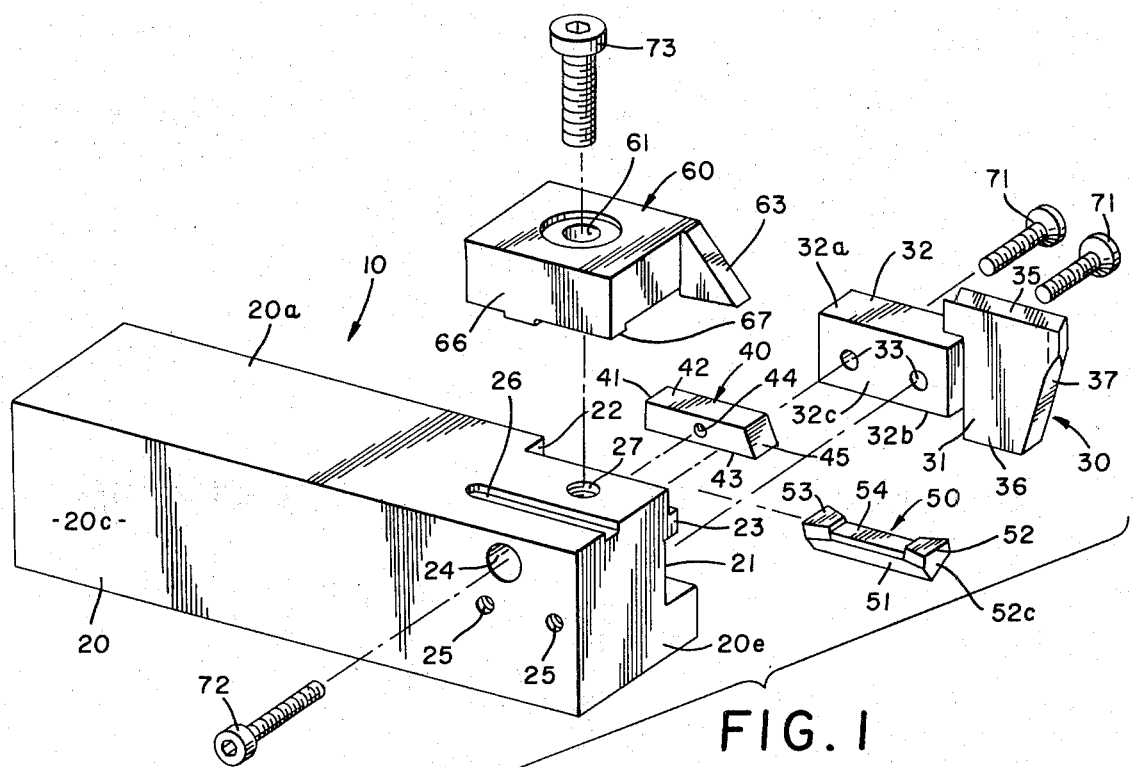

Referring now to the drawings and in particular to FIG. 1, the improved cutoff tool, generally designated by the numeral 10, includes a tool body 20, a support blade 30, a stop member 40, an insert 50, and a clamping block 60, with the arrangement being such that bolts 71,71 are used to draw the support blade 30 onto the tool body, with screw 72 holding the stop member in place with respect to the tool body 20 so as to permit the stop member 40 and the insert 50 to be clamped on top of the support blade 30 by the clamping member 60 which is, in turn, drawn down by the screw 73.

With reference to the detailed construction of the tool body 20, the same is shown as being of generally elongate, rectangular configuration in elevation so as to include a top surface 20a, a bottom surface 20b, a side surface 20c, and a cutting side surface 20d.

The side surface 20d is undercut adjacent the forward end 20e so as to define a groove 21 that extends rearwardly from the forward end 20e and terminates in a shoulder 22 as shown in FIG. 1. A rib 23 also projects from the side wall of the undercut groove 21 so as to overlie certain portions of the support plate 30 as will presently be described.

A transverse bore 24 is provided through the tool body 20 to permit the threaded portion of the bolt 72 to engage within the appropriate threaded opening 44 that is provided in the stop member 40 as clearly shown in FIG. 1 of the drawings. Tapped openings 25,25 similarly receive the threaded ends of bolts 71,71 following clamping of the support blade 30 in place on the tool body. A slot 26 is also provided on the upper surface 20a of tool body 20 for coaction with the clamping member 60 as will presently be described.

The support blade 30 is of generally elongated construction as shown in FIG. 1 and includes a forward support end 31 and a rearwardly projecting clamping end 32 that is designed to be clamped in place on the tool body 20 by the clamping block 60 as will be described.

Figures 2, 3:
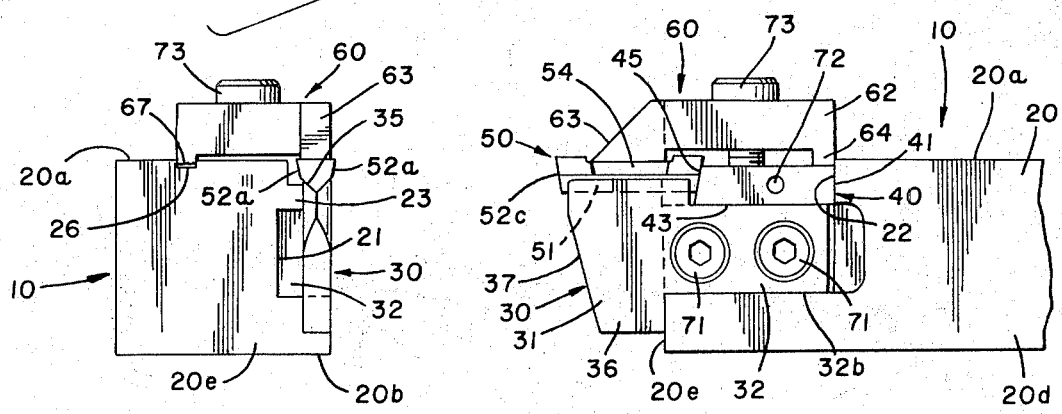

The rearward portion 32 of support blade 30 further includes an upper surface 32a, a lower surface 32b, and a side surface 32c, with the surfaces 32a, 32b, and 32c being intended to be received within the confines of the groove 21 so that the lower face of rib 23 overlies the upper surface 32a in abutment therewith as best shown in FIG. 2 of the drawing. It will also be noted that the rear end of portion 32 is spaced from the rear end of the pocket. Bores 33,33 are provided transversely of the rear portion 32 for the purposes of receiving the bolts 71,71 therein as is clearly shown in FIG. 3 of the drawings, for example.

Referring again to FIG. 1, the forward end 31 of support blade 30 is designed for the purpose of supporting the insert 50 thereon, and accordingly the same projects forwardly from the rear portion 32 in the blade-like configuration shown in FIG. 1, with a V-shaped support surface 35 being provided thereon for reception of the insert 50 which also has a complementary V-shaped bottom surface 51 as clearly shown in FIGS. 1 and 2 of the drawings.

It will be noted, however, that the support portion 31 of support blade 30 has a greater depth in this embodiment than was the case in the application now pending as Ser. No. 207,056 filed Dec. 13, 1971, and entitled "Improved Cutoff Tool." This area is designated by the numeral 36 and depends beneath the surface 32b as clearly shown in FIGS. 1 and 3 of the drawings. This extended portion contacts surface 20e and by this arrangement the surface 20e of the tool body provides a stop or point of resistance for any turning moment on the clamp that would result from application of pressure to the cutoff insert during use, and by this arrangement added stability and improved tool operation and accordingly tool life are obtained. As is conventional, a tapered surface 37 is provided on the forward end of the support blade 30 for clearance purposes.

Turning now to the construction of the stop member 40, it will be noted that the same is of generally block-like configuration so as to include a rear surface 41 that is designed to abut against the shoulder 22 of the tool body 20, a top surface 42 that is designed to be clamped by the rearward portion of the clamping member as will be described, and a bottom surface 43 which is adapted to be seated on a surface 32a of the support blade 30.

A tapped aperture 44 in stop member 40 receives the screw member 72 as previously indicated, while an inclined frontal surface 45 is adapted to serve as a seat for the unused end of the insert 50, as clearly shown in FIG. 3. Preferably the angle of inclination of the face 45 corresponds to the front clearance angle provided on the insert 50 so that a firm mating seat is provided.

Referring to FIG. 3, it will be noted that the height of the stop 40 is intended to be such that the same will contact the unused end of the insert 50 at a point below the cutting edge thereof, so that no force will be applied to the unused cutting edge prior to its period of use, with this arrangement avoiding damage to the unused end and particularly the cutting edge thereof.

The insert 50, shown in the preferred embodiment of the invention, generally conforms to the outline configuration of the insert shown in U.S. Pat. No. 3,611,525, although it is to be understood that a carbide tip can be placed on the end portion in lieu of the integral construction shown.

In all events, the illustrated insert includes cutting ends 52 and 53 interconnected by a reduced height central portion 54, and with the unit having a V-shaped bottom surface 51 as clearly shown in FIGS. 1 and 2 of the drawings.

Figure 4:
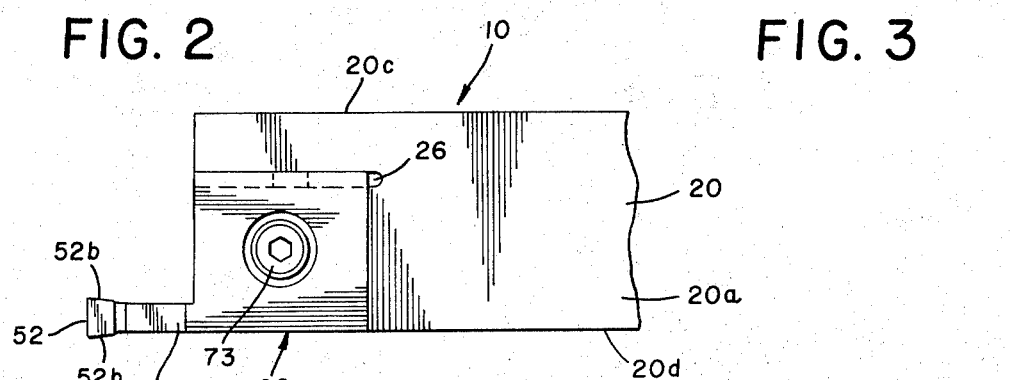

Referring to FIG. 2, the cutting end 52 is provided with the usual tapering side surfaces 52a,52a, while FIG. 4 shows how the top surfaces have back clearance 52b, 52b provided thereon. A front clearance angle 52c is shown provided on the insert in FIG. 3 of the drawings, with it being noted that this front clearance angle 52c is complemental to the angle of the surface 45 of the stop member 40 as best shown in FIG. 3.

It should be noted that while the invention has been illustrated in connection with a double-ended insert, it is also possible to utilize the broad concept disclosed herein with a single-ended insert if desired. Furthermore, it is also possible to utilize an insert which has no front clearance angle, such as illustrated in the drawings.

Referring again to the drawings, the clamping member 60 is generally of block-like configuration and includes a central bore 61 through which the bolt 73 may be passed for clamping purposes. Referring now to FIG. 3, it will be noted that one side 62 of the clamping block 60 includes a bit clamping arm 63 and a stop clamping arm 64, with these two arms being intended to clamp the bit and stop member in position, as clearly shown in FIGS. 2, 3, and 4 of the drawings.

In addition to the aforementioned component parts, the remaining side surface 66 includes a depending rib portion 67 (see FIG. 2) which rides in the slot 26 in the top surface 20a of body 20 for alignment purposes.

In use or operation of the improved cutoff tool, it will first be assumed that the component parts have been machined to the contour shown in FIG. 1. At this time it is merely necessary that the screws 71,71 be passed through the openings 33,33 in the support blade 30 and into the threaded openings 25,25 in the body whereupon the blade will be drawn into contact with the surface 21 as has been described.

Following this, the stop 40 may be positioned on the surface 32 of blade 30 by inserting the screw 72 into the aperture 24 of the body and into threaded opening 44. At this time it is merely necessary that the V-shaped surface 51 of the bit 50 be placed on the surface 35 of blade 30. When the stop is positioned as described, one end of bit 50 will project slightly beyond the front edge of the blade, as shown in FIG. 3, and at this time it is merely necessary to place the clamp 60 in position by engaging the rib 67 and groove 26. Following this, the bolt 73 can be screwed into the opening 27 so that arm 63 engages the central area 54 of insert 50, while arm 64 engages top surface 42 of stop 40.

At this time the tool is ready for use.

It will be seen from the foregoing that there has been provided a new and improved type of cutoff tool that is characterized by the unique use of an improved stop means that permits the use of a double-ended insert without any damaged to the end portion not being used.

It will be further noted how the provision of a stop member of this type enables some degree of adjustment to be obtained since the stops can be made of varying lengths so as to vary the degree of projection of the bit member 50 beyond the support blade 30.

Further, it will be seen how the interlocking rib and groove arrangement employed between the support blade and tool body produces a resistance against cutting forces that is augmented by the screws 71,71 being directly attached thereto from the opposed side so as to provide a highly simplified type of cutoff arrangement wherein no projections are provided on the cutting side.

Finally, it has been shown how the use of the unique stop permits the length, and therefore cost, of the cutting insert to be substantially reduced without materially affecting the overall operation of the cutoff tool because the stop will provide resistance to rearwardly directed forces.

It will also be seen how the construction of the tool has been improved from a rigidity and operational standpoint by provision of the depending hook-like portion on the forward support member 31 of the support blade 30. This depending portion serves the dual function of deepening the height of the support portion to give greater rigidity thereto, while simultaneously preventing any turning movement around the axis of the bolts 71,71, for example, during the application of cutting forces by virtue of its contact with surface 20e of the holder.

While a full and complete description of the invention has been set forth in accordance with the dictates of the Patent Statutes, it is to be understood that the invention is not intended to be limited to the specific embodiments herein shown. Accordingly, modification of the invention may be resorted to without departing from the spirit hereof or the scope of the appended claims.

What is claimed is:

1. In combination with (1) a cutting tool having an elongate tool body that includes a front surface and a sidewall surface with a tool receiving pocket opening into said front and said sidewall surfaces, and (2) a cutting bit having a V-shaped bottom, the improvement comrising;
   A. a support body having
      1. a blade-like forward support portion having a V-shaped top edge adapted to receive said V-shaped bottom of said cutting insert,
      2. a rearwardly projecting clamping end
         a. having a top surface and a bottom surface
         b. having a rib portion adapted to be received within said tool-receiving pocket in interlocking relationship therewith,
      3. said blade-like forward support portion
         a. having a transverse thickness that is less than the transverse thickness of said clamping end, and
         b. having a lower edge portion depending below the bottom surface portion of said clamping end for engagement with said front wall surface of said tool body.

2. In combination with (1) a cutting tool having an elongate tool body that includes a front surface and a sidewall surface with a tool receiving pocket opening into said front and said sidewall surfaces, and (2) a cutting bit having a V-shaped bottom, the improvement comprising;
   A. a support body having
      1. a blade-like forward support portion having a V-shaped top edge adapted to receive said V-shaped bottom of said cutting insert,
      2. a rearwardly projecting clamping end
         a. having a top surface and a bottom surface
         b. having a rib portion adapted to be received within said tool-receiving pocket in interlocking relationship therewith,
      3. said blade-like forward support portion
         a. having a transverse thickness that is less than the transverse thickness of said clamping end, and
         b. said V-shaped top edge of said forward support portion being located above said top surface of said clamping end, and
         c. having a lower edge portion depending below the bottom surface portion of said clamping end for engagement with said front wall surface of said tool body.

3. The device of claim 2 further characterized by the fact that said top surface of said clamping end is flat.

4. In combination with (1) a cutting tool having an elongate tool body that includes a front surface and a sidewall surface with a tool receiving pocket opening into said front and said sidewall surfaces, and (2) a cutting bit having a V-shaped bottom, the improvement comprising;
   A. a support body having
      1. a blade-like forward support portion having a V-shaped top edge adapted to receive said V-shaped bottom of said cutting insert,
      2. a rearwardly projecting clamping end
         a. having a top surface and a bottom surface
         b. having a rib portion adapted to be received within said tool-receiving pocket in interlocking relationship therewith,
      3. said blade-like forward support portion
         a. having a transverse thickness that is less than the transverse thickness of said clamping end,
         b. having a lower edge portion depending below the bottom surface portion of said clamping end for engagement with said front wall surface of said tool body, and
         c. said V-shaped top edge of said forward support portion being located above the top edge portion of said clamping end.

* * * * *